US011015719B2

(12) United States Patent
Ogino et al.

(10) Patent No.: US 11,015,719 B2
(45) Date of Patent: May 25, 2021

(54) ELECTROMAGNETIC VALVE MANIFOLD

(71) Applicant: CKD CORPORATION, Komaki (JP)

(72) Inventors: Ikuo Ogino, Komaki (JP); Kiyotoki Natsume, Komaki (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 16/426,932

(22) Filed: May 30, 2019

(65) Prior Publication Data

US 2019/0368617 A1 Dec. 5, 2019

(30) Foreign Application Priority Data

Jun. 5, 2018 (JP) .............................. JP2018-107801

(51) Int. Cl.
*F16K 1/42* (2006.01)
*F16K 31/06* (2006.01)
(Continued)

(52) U.S. Cl.
CPC ............ *F16K 1/425* (2013.01); *F16K 15/186* (2013.01); *F16K 24/02* (2013.01); *F16K 31/06* (2013.01); *F16K 43/00* (2013.01)

(58) Field of Classification Search
CPC ........ F16K 1/425; F16K 31/06; F16K 31/406; F16K 31/40; F16K 43/00; F16K 24/02;
(Continued)

(56) References Cited

U.S. PATENT DOCUMENTS 3,688,797 A * 9/1972 Sorenson ............ F15B 13/0857
137/625.64
4,515,184 A * 5/1985 Bownass ................. F16K 11/07
137/556
(Continued)

FOREIGN PATENT DOCUMENTS

CN 1123380 A 5/1996
JP S59-108872 U 7/1984
(Continued)

OTHER PUBLICATIONS

Office Action for Japanese Patent Application No. 2018-107801 dated Dec. 22, 2020 (English machine translation included) (6 pages).

(Continued)

*Primary Examiner* — Craig J Price
*Assistant Examiner* — Andrew J Rost
(74) *Attorney, Agent, or Firm* — Brandon V. Zuniga; James R. Gourley; Carstens & Cahoon, LLP (57) ABSTRACT

An electromagnetic valve manifold includes a manifold base including passages, a pilot electromagnetic valve including a valve body mounted on a mounting surface of the manifold base, a gasket arranged between the mounting surface and the valve body, and a check valve. The valve body includes an electromagnetic valve-side pilot fluid discharge passage. The manifold base includes a base-side pilot fluid discharge passage that opens in the mounting surface and communicates with the electromagnetic valve-side pilot fluid discharge passage. The check valve is configured to prevent fluid from flowing from the base-side pilot fluid discharge passage to the electromagnetic valve-side pilot fluid discharge passage. The check valve is integrated with the gasket.

8 Claims, 4 Drawing Sheets

(51) Int. Cl.
*F16K 43/00* (2006.01)
*F16K 24/02* (2006.01)
*F16K 15/18* (2006.01)

(58) Field of Classification Search
CPC ...... F16K 15/186; F16K 15/147; F16K 11/07; F15B 13/027; Y10T 137/87885; Y10T 137/87169–87241; Y10T 137/86493–86895
USPC .................. 137/884, 596–596.2, 625–625.5
See application file for complete search history.

(56) References Cited

U.S. PATENT DOCUMENTS

| | | | | |
|---|---|---|---|---|
| 4,676,514 | A * | 6/1987 | Beutter | F02M 35/10078 |
| | | | | 277/596 |
| 4,815,496 | A * | 3/1989 | Nishitani | F15B 13/0814 |
| | | | | 137/271 |
| 4,930,401 | A * | 6/1990 | Cameron | F15B 18/00 |
| | | | | 137/863 |
| 5,664,789 | A | 9/1997 | Hayashi | |
| 5,971,022 | A * | 10/1999 | Hayashi | F16K 11/0712 |
| | | | | 137/625.69 |
| 9,309,985 | B2 * | 4/2016 | Yoshimura | F16K 31/0658 |
| 9,878,329 | B2 * | 1/2018 | Iqbal | B01L 3/502715 |
| 2008/0093808 | A1 * | 4/2008 | Quick | B23K 26/355 |
| | | | | 277/595 |
| 2008/0280040 | A1 * | 11/2008 | Barrall | F16J 15/122 |
| | | | | 427/256 |

FOREIGN PATENT DOCUMENTS

| | | |
|---|---|---|
| JP | 3153119 B2 | 9/1997 |
| JP | H09-229217 A | 9/1997 |
| JP | 3766749 B2 | 9/1999 |

OTHER PUBLICATIONS

Office Action for Chinese Patent Application No. 201910463047.4 dated Apr. 6, 2021 (English machine translation included) (14 pages).

* cited by examiner

ELECTROMAGNETIC VALVE MANIFOLD

FIELD

The following description relates to an electromagnetic valve manifold.

DESCRIPTION OF RELATED ART

The electromagnetic valve manifold includes a manifold base and a pilot electromagnetic valve having a valve body mounted on a mounting surface of the manifold base. The manifold base includes passages that open in the mounting surface. The valve body of the pilot electromagnetic valve includes ports that respectively communicate with the passages and a valve hole that communicates with the ports and accommodates a valve member. Action of a pilot fluid moves the valve member back and forth in the valve hole, thereby connecting and disconnecting the ports to and from each other.

Japanese Patent No. 3766749 discloses an exemplary electromagnetic valve manifold including a sealing gasket arranged between the mounting surface of the manifold base and the valve body. The gasket is held between the mounting surface of the manifold base and the valve body. The gasket prevents fluid flowing between each passage and corresponding ports from leaking out of the section between the mounting surface of the manifold base and the valve body.

Further, the valve body includes an electromagnetic valve-side pilot fluid discharge passage through which a pilot fluid is discharged. The manifold base includes a base-side pilot fluid discharge passage that opens in the mounting surface and communicates with the electromagnetic valve-side pilot fluid discharge passage.

Japanese Patent No. 3153119 discloses an example of another exemplary electromagnetic valve manifold including a check valve that prevents fluid from flowing from the base-side pilot fluid discharge passage to the electromagnetic valve-side pilot fluid discharge passage. The check valve is held and arranged between the mounting surface of the manifold base and the valve body.

The check valve is a component that is smaller than, for example, the gasket. Thus, in the above-described electromagnetic valve manifold, in which the gasket and the check valve are arranged between the mounting surface of the manifold base and the valve body, during maintenance, for example, when the pilot electromagnetic valve is coupled to or removed from the manifold base, the check valve may fall off. In such a case, the check valve may be lost. Accordingly, the pilot electromagnetic valve cannot be efficiently coupled to or removed from the manifold base.

SUMMARY

It is an object of the present disclosure to provide an electromagnetic valve manifold that improves the working efficiency for coupling and removing a pilot electromagnetic valve to and from a manifold base.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electromagnetic valve manifold includes manifold base including passages and a mounting surface, a pilot electromagnetic valve including a valve body mounted on the mounting surface, a sealing gasket arranged between the mounting surface and the valve body, a check valve. The passages open in the mounting surface. The valve body includes ports that respectively communicate with the passages and a valve hole that communicates with the ports and accommodates a valve member. The valve member is configured to be moved back and forth in the valve hole by an action of a pilot fluid, thereby connecting and disconnecting the ports to and from each other. The valve body includes an electromagnetic valve-side pilot fluid discharge passage through which the pilot fluid is discharged. The manifold base includes a base-side pilot fluid discharge passage that opens in the mounting surface and communicates with the electromagnetic valve-side pilot fluid discharge passage. The check valve is configured to prevent fluid from flowing from the base-side pilot fluid discharge passage to the electromagnetic valve-side pilot fluid discharge passage. The check valve is integrated with the gasket.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An electromagnetic valve manifold 10 according to an embodiment will now be described with reference to FIGS. 1 to 4.

Figure 1:
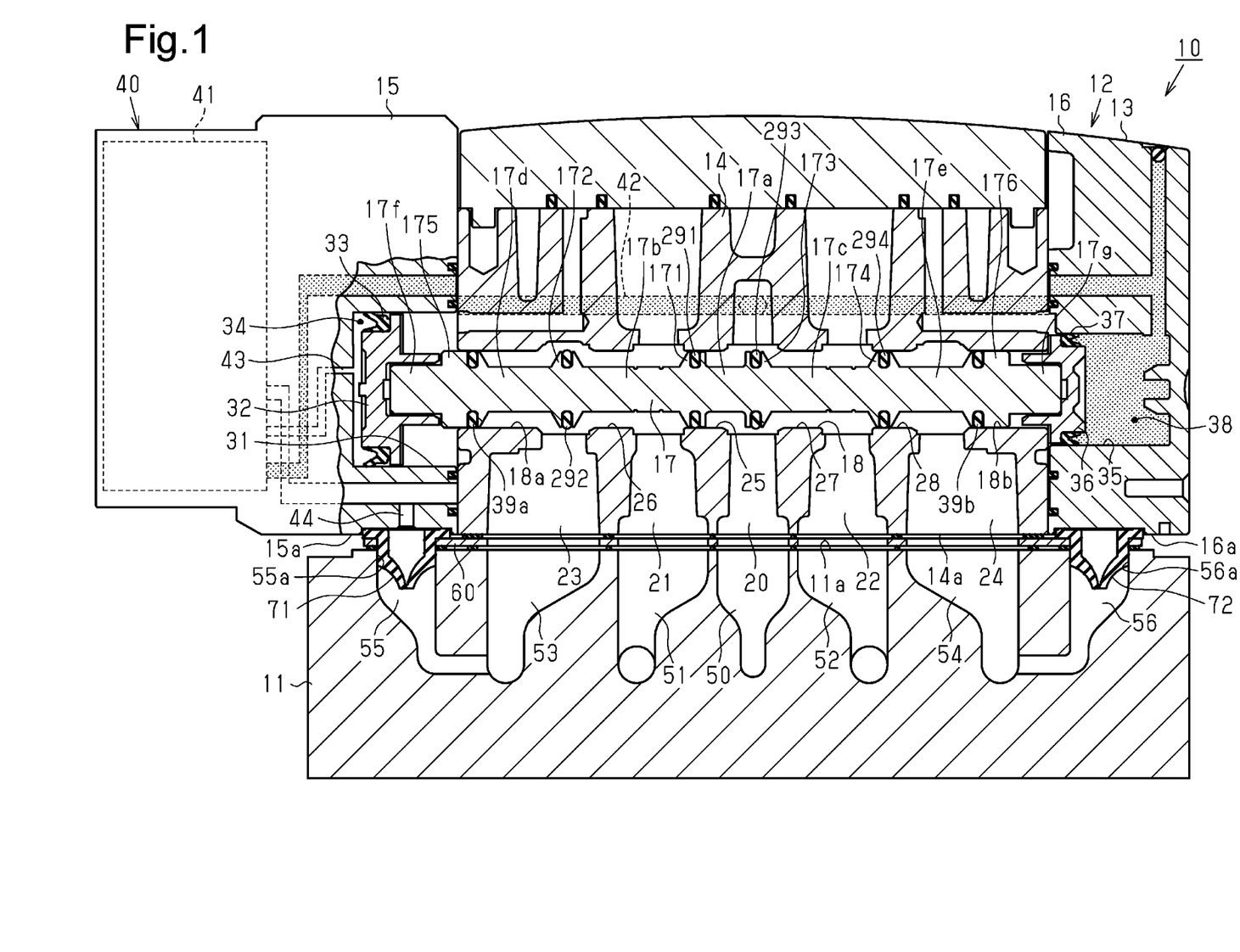
FIG. 1 is a vertical cross-sectional view showing an electromagnetic valve manifold according to an embodiment.

As shown in FIG. 1, the electromagnetic valve manifold 10 includes a quadrilateral block-shaped manifold base 11 and a pilot electromagnetic valve 12. The pilot electromagnetic valve 12 includes an elongated quadrilateral block-shaped valve body 13 mounted on a mounting surface 11a of the manifold base 11.

The valve body 13 includes an elongated quadrilateral block-shaped body member 14, a first coupled block 15 coupled to the first end of the body member 14 in a longitudinal direction, and a second coupled block 16 coupled to the second end of the body member 14 in the longitudinal direction. The body member 14, the first coupled block 15, and the second coupled block 16 are made of, for example, synthetic plastic. The body member 14 includes a body opposing surface 14a opposed to the mounting surface 11a. The first coupled block 15 includes a first opposing surface 15a opposed to the mounting surface 11a. The second coupled block 16 includes a second opposing surface 16a opposed to the mounting surface 11a.

The body member 14 includes a circular valve hole 18 that accommodates a valve member 17. The valve hole 18 extends in the longitudinal direction of the body member 14. The first end of the valve hole 18 opens in a first end surface of the body member 14 in the longitudinal direction, and the second end of the valve hole 18 opens in a second end surface of the body member 14 in the longitudinal direction. Thus, the valve hole 18 extends through the body member 14 in the longitudinal direction. The valve member 17 is a spool valve member accommodated in the valve hole 18 such that the valve member 17 is movable back and forth in the valve hole 18.

The body member 14 includes a supply port 20, a first output port 21, a second output port 22, a first discharge port 23, and a second discharge port 24. The supply port 20, the first output port 21, the second output port 22, the first discharge port 23, and the second discharge port 24 are ports formed in the valve body 13. The pilot electromagnetic valve 12 of the present embodiment is a five-port electromagnetic valve.

The five ports 20 to 24 are arranged in the order of the first discharge port 23, the first output port 21, the supply port 20, the second output port 22, and the second discharge port 24 from the first end to the second end of the body member 14 in the longitudinal direction. The first end of each of the ports 20 to 24 communicates with the valve hole 18. The second end of each of the ports 20 to 24 opens in the body opposing surface 14a of the body member 14.

The inner circumferential surface of the valve hole 18 includes a first valve seat 25 located between the supply port 20 and the first output port 21, a second valve seat 26 located between the first output port 21 and the first discharge port 23, a third valve seat 27 located between the supply port 20 and the second output port 22, and a fourth valve seat 28 located between the second output port 22 and the second discharge port 24. The first valve seat 25, the second valve seat 26, the third valve seat 27, and the fourth valve seat 28 have an annular shape and configure part of the inner circumferential surface of the valve hole 18.

The valve hole 18 includes a first hole portion 18a configuring the first end of the valve hole 18. The first hole portion 18a communicates with the first discharge port 23 and is located on the opposite side from the first discharge port 23 from the second valve seat 26. The valve hole 18 includes a second hole portion 18b configuring the second end of the valve hole 18. The second hole portion 18b communicates with the second discharge port 24 and is located on the opposite side from the second discharge port 24 from the fourth valve seat 28. The first valve seat 25, the second valve seat 26, the third valve seat 27, the fourth valve seat 28, the first hole portion 18a, and the second hole portion 18b have the same inner diameter.

The valve member 17 includes a first valve part 171, a second valve part 172, a third valve part 173, a fourth valve part 174, a fifth valve part 175, and a sixth valve part 176, which are spaced away from one another in an axial direction of the valve member 17. The first to sixth valve parts 171 to 176 are arranged in the order of the fifth valve part 175, the second valve part 172, the first valve part 171, the third valve part 173, the fourth valve part 174, and the sixth valve part 176 from the first end to the second end of the valve member 17 in the axial direction. The first to sixth valve parts 171 to 176 have the same diameter.

The valve member 17 includes a first shaft 17a that couples the first valve part 171 and the third valve part 173 to each other, a second shaft 17b that couples the first valve part 171 and the second valve part 172 to each other, and a third shaft 17c that couples the third valve part 173 and the fourth valve part 174 to each other. Further, the valve member 17 includes a fourth shaft 17d that couples the second valve part 172 and the fifth valve part 175 to each other and a fifth shaft 17e that couples the fourth valve part 174 and the sixth valve part 176 to each other.

The valve member 17 includes a columnar first protrusion 17f protruding from the end surface of the fifth valve part 175 on the opposite of the fourth shaft 17d. The first protrusion 17f is the first end of the valve member 17 in the axial direction. Further, the valve member 17 includes a columnar second protrusion 17g protruding from the end surface of the sixth valve part 176 on the opposite of the fifth shaft 17e. The second protrusion 17g is the second end of the valve member 17 in the axial direction.

The first to fifth shafts 17a to 17e, the first protrusion 17f, and the second protrusion 17g have the same outer diameter. The outer diameter of the first to sixth valve parts 171 to 176 is larger than the outer diameter of the first to fifth shafts 17a to 17e, the first protrusion 17f, and the second protrusion 17g.

The outer circumferential surface of the first valve part 171 is provided with a first spool packing 291 that seals the section between the supply port 20 and the first output port 21 when the first valve part 171 rests on the first valve seat 25. The outer circumferential surface of the second valve part 172 is provided with a second spool packing 292 that seals the section between the first output port 21 and the first discharge port 23 when the second valve part 172 rests on the second valve seat 26. The outer circumferential surface of the third valve part 173 is provided with a third spool packing 293 that seals the section between the supply port 20 and the second output port 22 when the third valve part 173 rests on the third valve seat 27. The outer circumferential surface of the fourth valve part 174 is provided with a fourth spool packing 294 that seals the section between the second output port 22 and the second discharge port 24 when the fourth valve part 174 rests on the fourth valve seat 28. The first to fourth spool packings 291 to 294 have an annular shape and are made of rubber.

The first coupled block 15 includes a circular first piston accommodation recess 31 that communicates with the first hole portion 18a. The first protrusion 17f of the valve member 17 is movable such that the first protrusion 17f moves from the first hole portion 18a into the first piston accommodation recess 31 and moves from the first piston accommodation recess 31 back into the first hole portion 18a. The first piston accommodation recess 31 accommodates a circular first piston 32 such that the first piston 32 is movable back and forth. The first piston 32 is coupled to the first protrusion 17f, which is the first end of the valve member 17. The outer circumferential surface of the first piston 32 is provided with a first lip packing 33. The first lip packing 33 seals the section between the first piston 32 and the inner circumferential surface of the first piston accommodation recess 31. The first piston 32 defines a first pilot pressure acting chamber 34 in the first piston accommodation recess 31. A pilot fluid is supplied to and discharged out of the first pilot pressure acting chamber 34.

The second coupled block 16 includes a circular second piston accommodation recess 35 that communicates with the second hole portion 18b. The second piston accommodation recess 35 has a smaller inner diameter than the first piston accommodation recess 31. The second protrusion 17g of the valve member 17 is movable such that the second protrusion 17g moves from the second hole portion 18b into the second piston accommodation recess 35 and moves from the second piston accommodation recess 35 back into the second hole portion 18b. The second piston accommodation recess 35 accommodates a circular second piston 36 such that the second piston 36 is movable back and forth. The second piston 36 is coupled to the second protrusion 17g, which is the second end of the valve member 17. The second piston 36 has a smaller outer diameter than the first piston 32. The outer circumferential surface of the second piston 36 is provided with a second lip packing 37. The second lip packing 37 seals the section between the second piston 36 and the inner circumferential surface of the second piston accommodation recess 35. The second piston 36 defines a second pilot pressure acting chamber 38 in the second piston accommodation recess 35. A pilot fluid is supplied to and discharged out of the second pilot pressure acting chamber 38.

The outer diameter of the second piston 36 is smaller than the outer diameter of the first piston 32. Thus, the pressure-receiving area of the second piston 36, that is, the area of where the second piston 36 receives the pressure of a pilot fluid in the second pilot pressure acting chamber 38 is smaller than the pressure-receiving area of the first piston 32, that is, the area of where the first piston 32 receives the pressure of a pilot fluid in the first pilot pressure acting chamber 34.

The outer circumferential surface of the fifth valve part 175 is provided with a first seal member 39a that seals the section between the fifth valve part 175 and the first hole portion 18a. The first seal member 39a has an annular shape and is made of rubber. The first seal member 39a restricts fluid from leaking from the first discharge port 23 through the first hole portion 18a to the first piston accommodation recess 31.

The outer circumferential surface of the sixth valve part 176 is provided with a second seal member 39b that seals the section between the sixth valve part 176 and the second hole portion 18b. The second seal member 39b has an annular shape and is made of rubber. The second seal member 39b restricts fluid from leaking from the second discharge port 24 through the second hole portion 18b to the second piston accommodation recess 35.

The pilot electromagnetic valve 12 includes a pilot valve part 40. The pilot electromagnetic valve 12 of the present embodiment is of a single pilot type, that is, a single pilot valve part 40 is provided. The pilot valve part 40 includes a solenoid part 41. The pilot valve part 40 is coupled to the end of the first coupled block 15 on the opposite side from the body member 14.

Further, the valve body 13 includes a pilot fluid supply passage 42 that communicates with the supply port 20 through the valve hole 18. The pilot fluid supply passage 42 opens at a position of the valve member 17 that constantly communicates with the supply port 20 regardless of the position of the valve member 17. The pilot fluid supply passage 42 branches halfway to be connected to the pilot valve part 40 and the second pilot pressure acting chamber 38.

The first coupled block 15 includes a pilot fluid output passage 43 that connects the pilot valve part 40 and the first pilot pressure acting chamber 34 to each other. Further, the first coupled block 15 includes a pilot fluid discharge passage 44 through which a pilot fluid is discharged. The first end of the pilot fluid discharge passage 44 is connected to the pilot valve part 40, and the second end of the pilot fluid discharge passage 44 opens in the first opposing surface 15a of the first coupled block 15.

The manifold base 11 includes a supply passage 50, a first output passage 51, a second output passage 52, a first discharge passage 53, and a second discharge passage 54. The supply passage 50, the first output passage 51, the second output passage 52, the first discharge passage 53, and the second discharge passage 54 are passages formed in the manifold base 11.

The five passages 50 to 54 open in the mounting surface 11a. The supply passage 50 includes a first end that opens in the mounting surface 11a and communicates with the supply port 20. The first output passage 51 includes a first end that opens in the mounting surface 11a and communicates with the first output port 21. The second output passage 521 includes a first end that opens in the mounting surface 11a and communicates with the second output port 22. The first discharge passage 53 includes a first end that opens in the mounting surface 11a and communicates with the first discharge port 23. The second discharge passage 54 includes a first end that opens in the mounting surface 11a and communicates with the second discharge passage 54.

The supply passage 50 includes a second end connected to a fluid supply source (not shown) by a pipe or the like. Each of the first output passage 51 and the second output passage 52 includes a second end connected to a fluid pressure device (not shown) by a pipe or the like. Each of the first discharge passage 53 and the second discharge passage 54 includes a second end connected to the atmosphere by a pipe or the like.

Additionally, the manifold base 11 includes a first base-side pilot fluid discharge passage 55 and a second base-side pilot fluid discharge passage 56. Thus, in the present embodiment, the manifold base 11 includes two base-side pilot fluid discharge passages.

The first end of the first base-side pilot fluid discharge passage 55 opens in a portion of the mounting surface 11a opposed to the first opposing surface 15a of the first coupled block 15 and communicates with the electromagnetic valve-side pilot fluid discharge passage 44. The second end of the first base-side pilot fluid discharge passage 55 communicates with the first discharge passage 53. The first end of the second base-side pilot fluid discharge passage 56 opens in a portion of the mounting surface 11a opposed to the second opposing surface 16a of the second coupled block 16. The second end of the second base-side pilot fluid discharge passage 56 communicates with the second discharge passage 54.

Fluid from the fluid supply source is constantly supplied to the second pilot pressure acting chamber 38 through the supply passage 50, the supply port 20, and the pilot fluid supply passage 42 and serves as a pilot fluid.

When the solenoid part 41 is supplied with power, the pilot valve part 40 causes the pilot fluid supply passage 42 and the pilot fluid output passage 43 to communicate with each other and disconnects the pilot fluid output passage 43 from the electromagnetic valve-side pilot fluid discharge passage 44. As a result, fluid from the fluid supply source is supplied to the first pilot pressure acting chamber 34 through the supply passage 50, the supply port 20, the pilot fluid supply passage 42, and the pilot fluid output passage 43 and serves as a pilot fluid.

The pressure-receiving area of the second piston 36 receiving a pilot fluid in the second pilot pressure acting chamber 38 is smaller than the pressure-receiving area of the first piston 32 receiving a pilot fluid in the first pilot pressure acting chamber 34. Thus, the valve member 17 moves toward the second piston accommodation recess 35. As a result, the supply port 20 and the first output port 21 communicate with each other, and the second output port 22 and the second discharge port 24 communicate with each other. Further, the section between the supply port 20 and the second output port 22 is sealed by the third spool packing 293 of the third valve part 173, and the section between the first output port 21 and the first discharge port 23 is sealed by the second spool packing 292 of the second valve part 172.

The fluid from the fluid supply source is supplied to the fluid pressure device through the supply passage 50, the supply port 20, the first output port 21, and the first output passage 51. Further, the fluid from the fluid pressure device is discharged to the atmosphere through the second output passage 52, the second output port 22, the second discharge port 24, and the second discharge passage 54.

When the supplying of power to the solenoid part 41 is stopped, the pilot valve part 40 causes the pilot fluid output passage 43 and the electromagnetic valve-side pilot fluid discharge passage 44 to communicate with each other and disconnects the pilot fluid supply passage 42 from the pilot fluid output passage 43. This stops supplying the fluid from the fluid supply source to the first pilot pressure acting chamber 34 through the supply passage 50, the supply port 20, the pilot fluid supply passage 42, and the pilot fluid output passage 43. The fluid in the first pilot pressure acting chamber 34 is discharged to the atmosphere through the pilot fluid output passage 43, the pilot fluid discharge passage 44, the first base-side pilot fluid discharge passage 55, and the first discharge passage 53. This moves the valve member 17 toward the first piston accommodation recess 31. As a result, the supply port 20 and the second output port 22 communicate with each other, and the first output port 21 and the first discharge port 23 communicate with each other. Further, the section between the supply port 20 and the first output port 21 is sealed by the first spool packing 291 of the first valve part 171, and the section between the second output port 22 and the second discharge port 24 is sealed by the fourth spool packing 294 of the fourth valve part 174.

The fluid from the fluid supply source is supplied to the fluid pressure device through the supply passage 50, the supply port 20, the second output port 22, and the second output passage 52. Further, the fluid from the fluid pressure device is discharged to the atmosphere through the first output passage 51, the first output port 21, the first discharge port 23, and the first discharge passage 53.

Accordingly, the pilot electromagnetic valve 12 of the present embodiment is of an internal pilot type, in which part of fluid that has been supplied to the supply port 20 is supplied to the first pilot pressure acting chamber 34 and the second pilot pressure acting chamber 38. Action of a pilot fluid moves the valve member 17 back and forth in the valve hole 18, thereby connecting and disconnecting the ports to and from each other.

The electromagnetic valve manifold 10 includes a gasket 60 that seals the section between the mounting surface 11a and the valve body 13. The gasket 60 is arranged between the mounting surface 11a and the valve body 13. Further, the electromagnetic valve manifold 10 includes a first check valve 71 that prevents fluid from flowing from the first base-side pilot fluid discharge passage 55 to the electromagnetic valve-side pilot fluid discharge passage 44. In addition, the electromagnetic valve manifold 10 includes a second check valve 72, which is used when the pilot electromagnetic valve 12 is of a double pilot type, that is, when the pilot electromagnetic valve 12 has two pilot valve parts 40.

Figure 2:
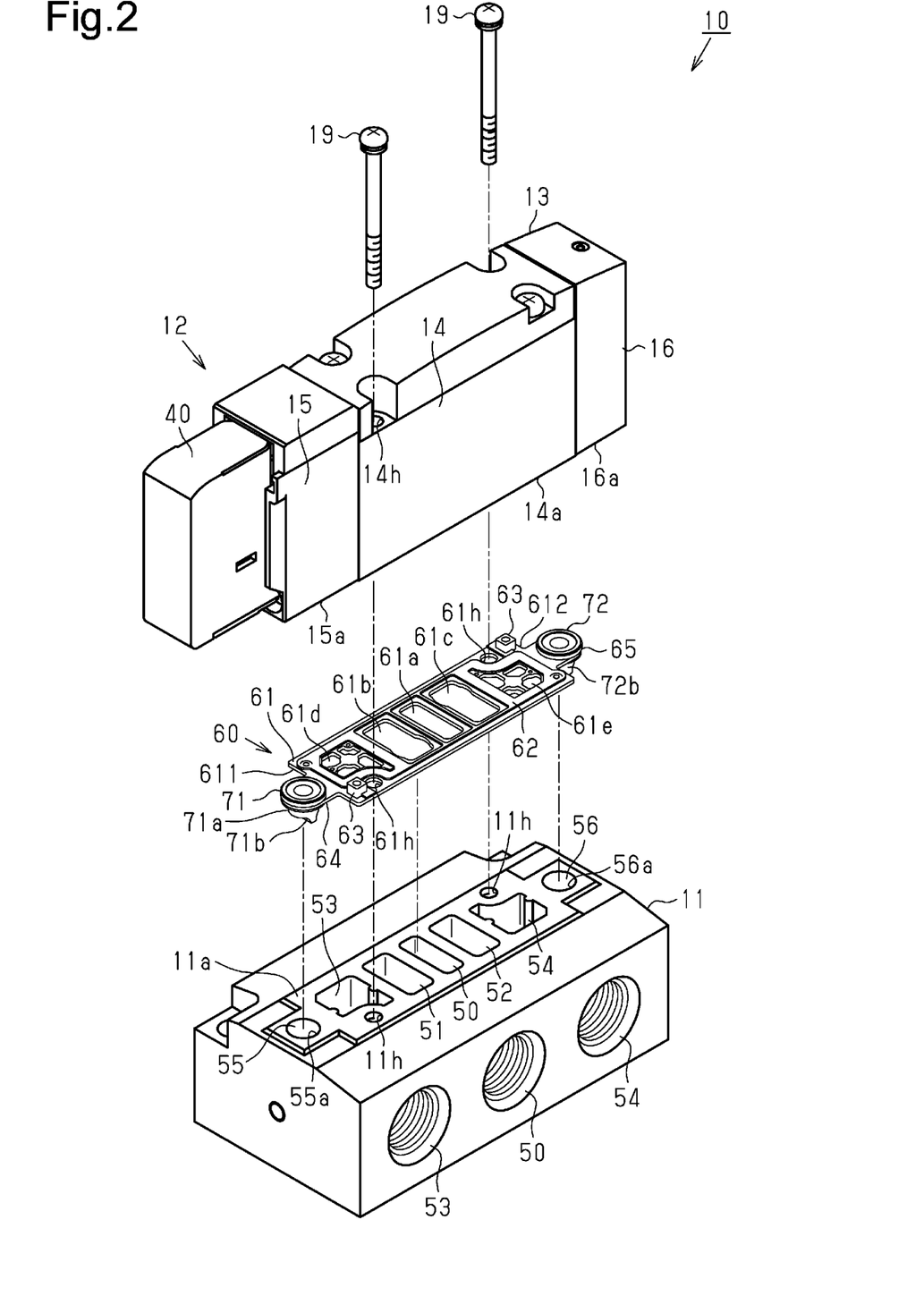
FIG. 2 is an exploded perspective view showing the electromagnetic valve manifold shown in FIG. 1.

As shown in FIG. 2, the gasket 60 includes a metal plate 61 and two seal members 62 joined to the metal plate 61 and made of rubber. The seal members 62 are respectively joined to the opposite surfaces of the metal plate 61.

The metal plate 61 is an elongated flat plate. The metal plate 61 includes a first communication hole 61a, a second communication hole 61b, a third communication hole 61c, a fourth communication hole 61d, and a fifth communication hole 61e. The first to fifth communication holes 61a to 61e are arranged in the longitudinal direction of the metal plate 61 and extend through the metal plate 61 in the thickness direction. The first communication hole 61a connects the supply port 20 and the supply passage 50 with each other. The second communication hole 61b connects the first output port 21 and the first output passage 51 with each other. The third communication hole 61c connects the second output port 22 and the second output passage 52 with each other. The fourth communication hole 61d connects the first discharge port 23 and the first discharge passage 53 with each other. The fifth communication hole 61e connects the second discharge port 24 and the second discharge passage 54 with each other.

Each seal member 62 is joined to one of the opposite surfaces of the metal plate 61 so as to surround the first communication hole 61a, the second communication hole 61b, the third communication hole 61c, the fourth communication hole 61d, and the fifth communication hole 61e one by one.

The surface of the opposite surfaces of the metal plate 61 opposed to the body opposing surface 14a of the body member 14 is provided with two positioning protrusions 63. The positioning protrusions 63 are respectively arranged at two diagonally-located corners of the four corners of the metal plate 61.

The metal plate 61 includes two screw insertion holes 61h. Each screw insertion hole 61h extends through the metal plate 61 in the thickness direction. Each screw insertion hole 61h is arranged at a position adjacent to the corresponding positioning protrusion 63 in the longitudinal direction of the metal plate 61.

The metal plate 61 includes a first coupling portion 64 and a second coupling portion 65. The first coupling portion 64 has a flat shape and protrudes from a first side edge 611, which is one of the opposite edges of the metal plate 61 in the longitudinal direction. The second coupling portion 65 has a flat shape and protrudes from a second side edge 612, which is the other one of the opposite edges of the metal plate 61 in the longitudinal direction. The first coupling portion 64 and the second coupling portion 65 respectively extend from the side edges 611 and 612 in a direction in which the first coupling portion 64 and the second coupling portion 65 are spaced apart from each other in the longitudinal direction of the metal plate 61.

Figure 3:
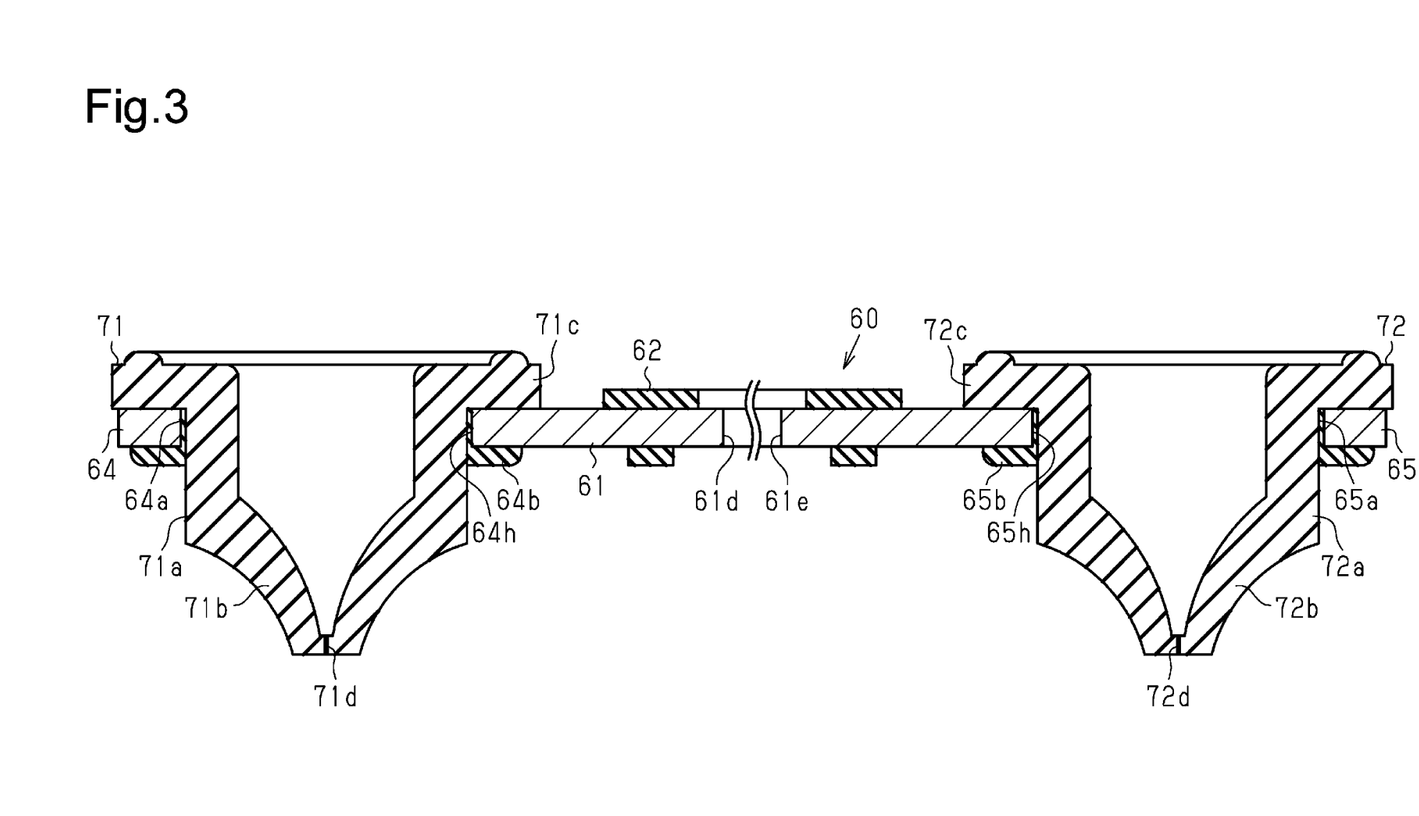
FIG. 3 is an enlarged partial cross-sectional view showing the surroundings of a first check valve and a second check valve in the electromagnetic valve manifold of FIG. 1.

As shown in FIG. 3, the first coupling portion 64 includes an insertion hole 64h. The insertion hole 64h has a circular shape and extends through the first coupling portion 64 in the thickness direction. A rubber elastic portion 64a is joined to the inner circumferential surface of the insertion hole 64h. The elastic portion 64a has an annular shape and covers the entire inner circumferential surface of the insertion hole 64h. The first coupling portion 64 includes a first surface opposed to the mounting surface 11a. A rubber seal part 64b is joined to the surrounding part of the insertion hole 64h in the first surface of the first coupling portion 64. The seal part 64b is annular. The inner circumferential edge of the seal part 64b is continuous with the elastic portion 64a. The elastic portion 64a extends in the axial direction from the inner circumferential edge of the seal part 64b. The elastic portion 64a and the seal part 64b are formed integrally with each other.

The second coupling portion 65 includes an insertion hole 65h. The insertion hole 65h has a circular shape and extends through the second coupling portion 65 in the thickness direction. A rubber elastic portion 65a is joined to the inner circumferential surface of the insertion hole 65h. The elastic portion 65a has an annular shape and covers the entire inner circumferential surface of the insertion hole 65h. The second coupling portion 65 includes a first surface opposed to the mounting surface 11a. A rubber seal part 65b is joined to the surrounding part of the insertion hole 65h in the first surface of the second coupling portion 65. The seal part 65b is annular. The inner circumferential edge of the seal part 65b is continuous with the elastic portion 65a. The elastic portion 65a extends in the axial direction from the inner circumferential edge of the seal part 65b. The elastic portion 65a and the seal part 65b are formed integrally with each other.

The first check valve 71 is of a duckbill type including a circumferential wall 71a, a beak part 71b, and a flange 71c. The circumferential wall 71a has a cylindrical shape. The beak part 71b is continuous with the first end of the circumferential wall 71a in the axial direction. Also, the beak part 71b tapers as the beak part 71b becomes farther from the circumferential wall 71a. The flange 71c, which is annular, is continuous with the outer circumferential edge of the second end of the circumferential wall 71a in the axial direction and extends radially outward from the outer circumferential edge of the second end of the circumferential wall 71a. The distal end of the beak part 71b is provided with a slit 71d that allows the inside and outside of the beak part 71b to communicate with each other.

The first check valve 71 is coupled to the first coupling portion 64 with the circumferential wall 71a inserted through the insertion hole 64h of the first coupling portion 64. The first coupling portion 64 includes a second surface opposed to the first opposing surface 15a. The flange 71c is in close contact with the surrounding part of the insertion hole 64h in the second surface of the first coupling portion 64. The portion corresponding to the first end of the circumferential wall 71a protrudes from the seal part 64b through the insertion hole 64h.

Thus, part of the first check valve 71 is inserted through the insertion hole 64h, and the first check valve 71 is inserted through the insertion hole 64h and coupled to the first coupling portion 64. Inserting the circumferential wall 71a through the insertion hole 64h elastically deforms the elastic portion 64a to be crushed between the inner circumferential surface of the insertion hole 64h and the circumferential wall 71a. Thus, the elastic portion 64a is arranged between the inner circumferential surface of the insertion hole 64h and the first check valve 71. A restoring force that restores the elastic portion 64a to its original shape prior to being elastically deformed is applied to fasten the first check valve 71 to the inner circumferential surface of the insertion hole 64h with the elastic portion 64a located in between. Thus, the first check valve 71, which is separate from the gasket 60, is fixed to and integrated with the gasket 60.

The second check valve 72 is of a duckbill type including a circumferential wall 72a, a beak part 72b, and a flange 72c. The circumferential wall 72a has a cylindrical shape. The beak part 72b is continuous with the first end of the circumferential wall 72a in the axial direction. Also, the beak part 72b tapers as the beak part 72b becomes farther from the circumferential wall 72a. The flange 72c, which is annular, is continuous with the outer circumferential edge of the second end of the circumferential wall 72a in the axial direction and extends radially outward from the outer circumferential edge of the second end of the circumferential wall 72a. The distal end of the beak part 72b is provided with a slit 72d that allows the inside and outside of the beak part 72b to communicate with each other.

The second check valve 72 is coupled to the second coupling portion 65 with the circumferential wall 72a inserted through the insertion hole 65h of the second coupling portion 65. The second coupling portion 65 includes a second surface opposed to the second opposing surface 16a. The flange 72c is in close contact with the surrounding part of the insertion hole 65h in the second surface of the second coupling portion 65. The portion corresponding to the first end of the circumferential wall 72a protrudes from the seal part 65b through the insertion hole 65h.

Thus, part of the second check valve 72 is inserted through the insertion hole 65h, and the second check valve 72 is inserted through the insertion hole 65h and coupled to the second coupling portion 65. Inserting the circumferential wall 72a through the insertion hole 65h elastically deforms the elastic portion 65a to be crushed between the inner circumferential surface of the insertion hole 65h and the circumferential wall 72a. Thus, the elastic portion 65a is arranged between the inner circumferential surface of the insertion hole 65h and the second check valve 72. A restoring force that restores the elastic portion 65a to its original shape prior to being elastically deformed is applied to fasten the second check valve 72 to the inner circumferential surface of the insertion hole 65h with the elastic portion 65a located in between. Thus, the second check valve 72, which is separate from the gasket 60, is fixed to and integrated with the gasket 60. Accordingly, in the present embodiment, two check valves are fixed to and integrated with the gasket 60. The term "integrate" refers to fixing (or fitting) the check valves 71 and 72, which are separate from the gasket 60, to the gasket 60, and integrally forming the check valves 71 and 72 with the gasket 60.

Figure 4:
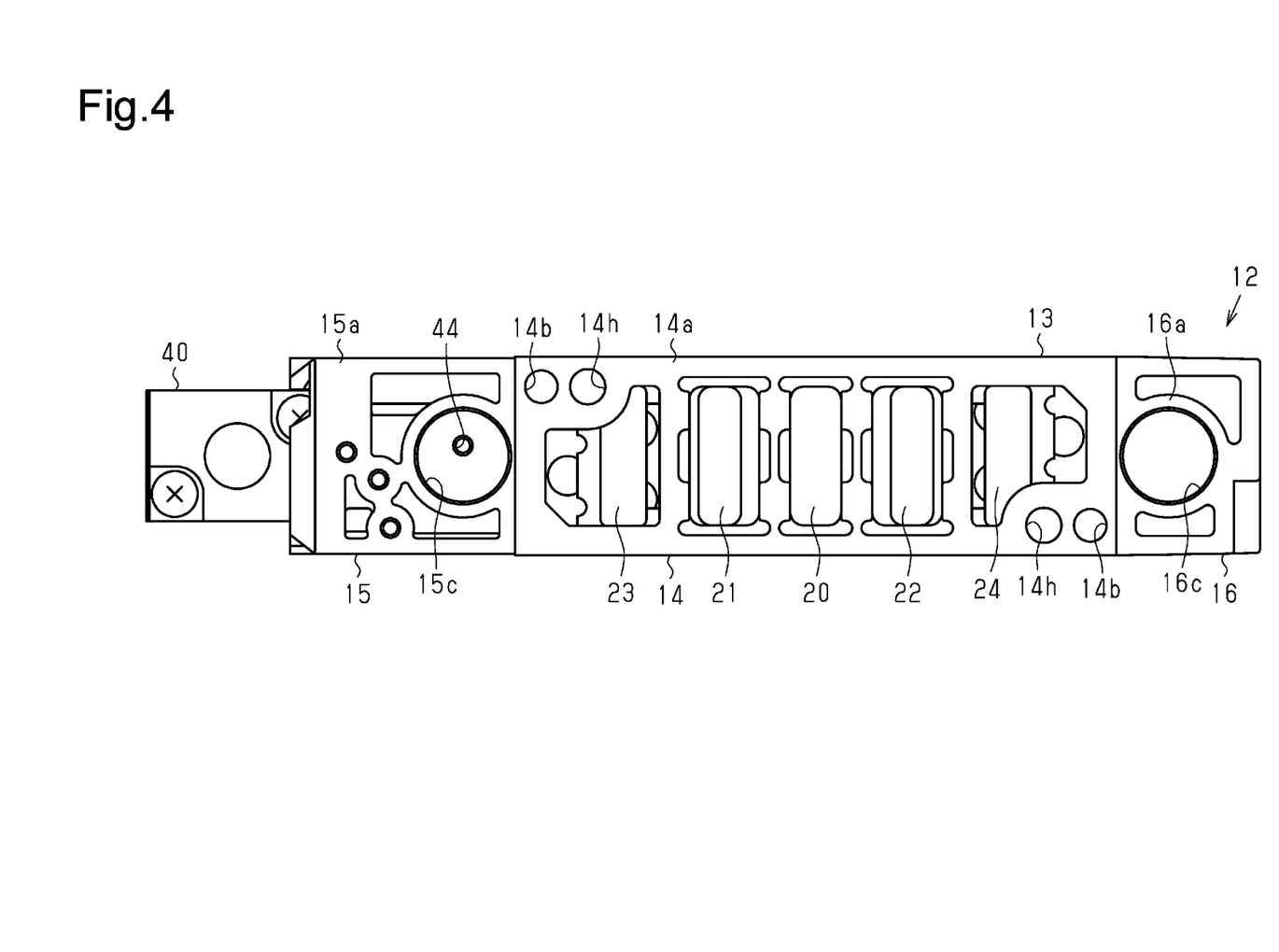
FIG. 4 is a plan view of the pilot electromagnetic valve in the electromagnetic valve manifold of FIG. 1 as viewed from a position where the pilot electromagnetic valve is coupled to the manifold base.

As shown in FIG. 4, the first opposing surface 15a of the first coupled block 15 includes a circular fixing recess 15c into which the flange 71c of the first check valve 71 is fitted. The inner space of the fixing recess 15c communicates with the electromagnetic valve-side pilot fluid discharge passage 44. The electromagnetic valve-side pilot fluid discharge passage 44 opens in the bottom surface of the fixing recess 15c, which configures part of the first opposing surface 15a. When the flange 71c of the first check valve 71 is fitted into the fixing recess 15c, the electromagnetic valve-side pilot fluid discharge passage 44 and the inner space of the first check valve 71 communicate with each other.

The flange 71c of the first check valve 71 is held between the bottom surface of the fixing recess 15c and the second surface of the first coupling portion 64 around the insertion hole 64h. The flange 71c seals the section between the bottom surface of the fixing recess 15c and the second surface of the first coupling portion 64 around the insertion hole 64h. The seal part 64b is held between the first surface of the first coupling portion 64 and the mounting surface 11a around the insertion hole 64h. The seal part 64b seals the section between the first surface of the first coupling portion 64 and the mounting surface 11a around the insertion hole 64h.

The second opposing surface 16a of the second coupled block 16 includes a circular fixing recess 16c into which the flange 72c of the second check valve 72 is fitted. The flange 72c of the second check valve 72 is held between the bottom surface of the fixing recess 16c and the second surface of the second coupling portion 65 around the insertion hole 65h. The flange 72c seals the section between the bottom surface of the fixing recess 16c and the second surface of the second coupling portion 65 around the insertion hole 65h. The seal part 65b is held between the first surface of the second coupling portion 65 and the mounting surface 11a around the insertion hole 65h. The seal part 65b seals the section between the first surface of the second coupling portion 65 and the mounting surface 11a around the insertion hole 65h.

The body opposing surface 14a of the body member 14 has an insertion recess 14b into which each positioning protrusion 63 is inserted. The insertion recesses 14b are respectively arranged at two diagonally-located corners of the four corners of the body opposing surface 14a. Further, the body member 14 includes two screw insertion holes 14h. Each screw insertion hole 14h is arranged at a position adjacent to the corresponding insertion recess 14b in the longitudinal direction of the body member 14.

As shown in FIG. 2, the mounting surface 11a has two internal threaded holes 11h. A screw 19 is screwed through each screw insertion hole 14h of the body member 14 and each screw insertion hole 61h of the gasket 60 into each internal threaded hole 11h. This holds the gasket 60 between the mounting surface 11a and the valve body 13 and couples the pilot electromagnetic valve 12 to the mounting surface 11a.

The first base-side pilot fluid discharge passage 55 includes an opening 55a that opens in the mounting surface 11a, and the second base-side pilot fluid discharge passage 56 includes an opening 56a that opens in the mounting surface 11a. In a state in which the pilot electromagnetic valve 12 is coupled to the manifold base 11, the circumferential wall 71a of the first check valve 71 is fitted into the opening 55a of the first base-side pilot fluid discharge passage 55, and the circumferential wall 72a of the second check valve 72 is fitted into the opening 56a of the second base-side pilot fluid discharge passage 56. The two openings 55a and 56a are circular. The outer diameter of each of the circumferential walls 71a and 72a is slightly smaller than the inner diameter of the corresponding one of the openings 55a and 56a. Each of the circumferential walls 71a and 72a is firmly fitted into the corresponding one of the openings 55a and 56a.

In this manner, the circumferential wall 71a of the first check valve 71 is a fitted portion fitted into the opening 55a of the first base-side pilot fluid discharge passage 55. Thus, the first check valve 71 includes a fitted portion fitted into the opening 55a of the first base-side pilot fluid discharge passage 55. The circumferential wall 72a of the second check valve 72 is a fitted portion fitted into the opening 56a of the second base-side pilot fluid discharge passage 56. Thus, the second check valve 72 includes a fitted portion fitted into the opening 56a of the second base-side pilot fluid discharge passage 56.

The operation of the present embodiment will now be described.

When the pressure in the first check valve 71 reaches a predetermined pressure, the slit 71d of the first check valve 71 opens. Then, the first check valve 71 allows fluid to flow from the electromagnetic valve-side pilot fluid discharge passage 44 toward the first base-side pilot fluid discharge passage 55. This causes the fluid that has flowed from the electromagnetic valve-side pilot fluid discharge passage 44 into the first check valve 71 to flow through the first check valve 71 to the first base-side pilot fluid discharge passage 55. When the pressure in the first check valve 71 is less than the predetermined pressure, the slit 71d closes. Then, the first check valve 71 prevents fluid from flowing from the first base-side pilot fluid discharge passage 55 to the electromagnetic valve-side pilot fluid discharge passage 44.

The above-described embodiment has the following advantages.

(1) The first check valve 71 and the second check valve 72 are integrated with the gasket 60. Thus, for example, during maintenance, when the pilot electromagnetic valve 12 is coupled to or removed from the manifold base 11, the first check valve 71 or the second check valve 72 does not fall off separately. Accordingly, when the pilot electromagnetic valve 12 is coupled to or removed from the manifold base 11, the first check valve 71 or the second check valve 72 is prevented from being lost. This improves the working efficiency for coupling and removing the pilot electromagnetic valve 12 to and from the manifold base 11.

(2) The circumferential wall 71a of the first check valve 71 is fitted into the opening 55a of the first base-side pilot fluid discharge passage 55, which opens in the mounting surface 11a. This improves the position accuracy of the first check valve 71 relative to the first base-side pilot fluid discharge passage 55. In addition, the circumferential wall 72a of the second check valve 72 is fitted into the opening 56a of the second base-side pilot fluid discharge passage 56, which opens in the mounting surface 11a. This improves the position accuracy of the second check valve 72 relative to the second base-side pilot fluid discharge passage 56. Thus, the working efficiency for coupling the pilot electromagnetic valve 12 to the manifold base 11 is improved.

(3) The manifold base 11 includes two base-side pilot fluid discharge passages, that is, the first base-side pilot fluid discharge passage 55 and the second base-side pilot fluid discharge passage 56. Two check valves, that is, the first check valve 71 and the second check valve 72, are integrated with the gasket 60. In this structure, the circumferential wall 71a of the first check valve 71 and the circumferential wall 72a of the second check valve 72 are respectively fitted into the opening 55a of the first base-side pilot fluid discharge passage 55 and the opening 56a of the second base-side pilot fluid discharge passage 56. This improves the position accuracy of the gasket 60 relative to the mounting surface 11a. Thus, the working efficiency for coupling the pilot electromagnetic valve 12 to the manifold base 11 is improved.

(4) The gasket 60 includes the metal plate 61 and the seal member 62, which is joined to the metal plate 61 and made of rubber. The metal plate 61 includes the first coupling portion 64, which includes the insertion hole 64h through which part of the first check valve 71 is inserted, and the second coupling portion 65, which includes the insertion hole 65h through which part of the second check valve 72 is inserted. The first check valve 71 is inserted through the insertion hole 64h and coupled to the insertion hole 64h, and the second check valve 72 is inserted through the insertion hole 65h and coupled to the second coupling portion 65. In this structure, part of the first check valve 71 is inserted through the insertion hole 64h of the first coupling portion 64 and coupled to the first coupling portion 64 so that the first check valve 71, which is separate from the gasket 60, is integrated with the gasket 60. Further, part of the second check valve 72 is inserted through the insertion hole 65h of the second coupling portion 65 and coupled to the second coupling portion 65 so that the second check valve 72, which is separate from the gasket 60, is integrated with the gasket 60. In this manner, the first check valve 71 and the second check valve 72 are integrated with the gasket 60. Thus, as compared to when, for example, the first check valve 71 and the second check valve 72 are formed integrally with the seal member 62 of the gasket 60, the first check valve 71, the second check valve 72, and the gasket 60 are easily manufactured.

(5) The elastic portion 64a is arranged between the inner circumferential surface of the insertion hole 64h of the first coupling portion 64 and the first check valve 71, and the elastic portion 65a is arranged between the inner circumferential surface of the insertion hole 65h of the second coupling portion 65 and the second check valve 72. In this structure, inserting part of the first check valve 71 through the insertion hole 64h elastically deforms the elastic portion 64a to be crushed between the inner circumferential surface of the insertion hole 64h and the first check valve 71. A restoring force that restores the elastic portion 64a to its original shape prior to being elastically deformed is applied to fasten the first check valve 71 to the inner circumferential surface of the insertion hole 64h with the elastic portion 64a located in between. Further, in this structure, inserting part of the second check valve 72 through the insertion hole 65h elastically deforms the elastic portion 65a to be crushed between the inner circumferential surface of the insertion hole 65h and the second check valve 72. A restoring force that restores the elastic portion 65a to its original shape prior to being elastically deformed is applied to fasten the second check valve 72 to the inner circumferential surface of the insertion hole 65h with the elastic portion 65a located in between. This limits the separation of the first check valve 71 from the insertion hole 64h and the separation of the second check valve 72 from the insertion hole 65h. Further, this allows the first check valve 71 and the second check valve 72 to be strongly coupled to the first coupling portion 64 and the second coupling portion 65, respectively.

(6) Fitting the flange 71c of the first check valve 71 into the fixing recess 15c improves the position accuracy of the first check valve 71 relative to the valve body 13. Further, fitting the flange 72c of the second check valve 72 into the fixing recess 16c improves the position accuracy of the second check valve 72 relative to the valve body 13. This improves the working efficiency for coupling the pilot electromagnetic valve 12 to the manifold base 11.

(7) Inserting each positioning protrusion 63 into the corresponding insertion recess 14b improves the position accuracy of the gasket 60 relative to the valve body 13. This improves the working efficiency for coupling the pilot electromagnetic valve 12 to the manifold base 11.

The above illustrated embodiment may be modified as follows. The above-described embodiment and the following modifications can be combined as long as the combined modifications remain technically consistent with each other.

For example, the second check valve 72 does not have to be integrated with the gasket 60, and only the first check valve 71 may be integrated with the gasket 60.

The pilot electromagnetic valve 12 does not have to include the second check valve 72. In this structure, the manifold base 11 does not have to include the second base-side pilot fluid discharge passage 56 and may include only the first base-side pilot fluid discharge passage 55. Accordingly, the manifold base 11 may include a single base-side pilot fluid discharge passage.

For example, the first check valve 71 may be formed integrally with the seal member 62 of the gasket 60. Further, the second check valve 72 may be formed integrally with the seal member 62 of the gasket 60.

The elastic portion 64a does not have to be arranged between the inner circumferential surface of the insertion hole 64h of the first coupling portion 64 and the first check valve 71, and the elastic portion 65a does not have to be arranged between the inner circumferential surface of the insertion hole 65h of the second coupling portion 65 and the second check valve 72.

For example, the mounting surface 11a may include a clearance recess corresponding to each of the first check valve 71 and the second check valve 72 such that the mounting surface 11a does not interfere with the first check valve 71 and the second check valve 72. Each of the first base-side pilot fluid discharge passage 55 and the second base-side pilot fluid discharge passage 56 may open in the bottom surface of the corresponding clearance recess. Additionally, for example, the distal end of the beak part 71b of the first check valve 71 and the distal end of the beak part 72b of the second check valve 72 may each be located in the corresponding clearance recess. That is, the circumferential wall 71a of the first check valve 71 does not have to be fitted into the opening 55a of the first base-side pilot fluid discharge passage 55, and the circumferential wall 72a of the second check valve 72 is fitted into the opening 56a of the second base-side pilot fluid discharge passage 56.

The gasket 60 does not have to include the metal plate 61 and may be configured only by, for example, a plate-shaped rubber seal member.

The elastic portions 64a and 65a may have an annular shape covering only part of the inner circumferential surfaces of the insertion hole 64h and 65h. That is, the elastic portions 64a and 65a do not have to have an endless annular shape.

The elastic portions 64a and 65a do not have to be continuous with the seal parts 64b and 65b.

The elastic portions 64a and 65a do not have to be formed integrally with the seal parts 64b and 65b and may be separate from the elastic portions 64a and 65a.

The first check valve 71 and the second check valve 72 do not have to be of a duckbill type and may be of an umbrella type. In short, as long as the first check valve 71 and the second check valve 72 can be integrated with the gasket 60, the shapes of the first check valve 71 and the second check valve 72 are not particularly limited.

The first piston 32 and the second piston 36 may have the same diameter, and a biasing spring that biases the valve member 17 toward the first piston accommodation recess 31 may be accommodated in the second piston accommodation recess 35. For example, the pressure in the first pilot pressure acting chamber 34 may resist the biasing force of the biasing spring to move the valve member 17 toward the second piston accommodation recess 35.

The pilot electromagnetic valve 12 may be of an external pilot type in which fluid is supplied to the first pilot pressure acting chamber 34 and the second pilot pressure acting chamber 38 from the outside of the pilot electromagnetic valve 12, instead of the supply port 20.

The pilot electromagnetic valve 12 may be of a double pilot type including two pilot valve parts 40.

The pilot electromagnetic valve 12 may be of, for example, a three-port electromagnetic valve. Thus, the number of ports formed in the valve body 13 may be changed, and the number of passages formed in the manifold base 11 may be changed in correspondence with the number of ports formed in the valve body 13.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electromagnetic valve manifold comprising:
   a manifold base including passages and a mounting surface;
   a pilot electromagnetic valve including a valve body mounted on the mounting surface;
   a sealing gasket arranged between the mounting surface and the valve body; and
   a check valve, wherein:
   the passages open in the mounting surface,
   the valve body includes ports that respectively communicate with the passages and a valve hole that communicates with the ports and accommodates a valve member,
   the valve member is configured to be moved back and forth in the valve hole by an action of a pilot fluid, thereby connecting and disconnecting the ports to and from each other,
   the valve body includes an electromagnetic valve-side pilot fluid discharge passage through which the pilot fluid is discharged,
   the manifold base includes a base-side pilot fluid discharge passage that opens in the mounting surface and communicates with the electromagnetic valve-side pilot fluid discharge passage,
   the check valve is configured to prevent fluid from flowing from the base-side pilot fluid discharge passage to the electromagnetic valve-side pilot fluid discharge passage,
   the check valve is a separate member from the gasket and detachably attached to the gasket,
   the gasket includes an insertion hole through which the check valve is inserted, and
   the check valve includes a circumferential wall that extends through the insertion hole and is fastened to an inner circumferential surface of the insertion hole.

2. The electromagnetic valve manifold according to claim 1, wherein:
   the base-side pilot fluid discharge passage includes an opening that opens in the mounting surface, and
   the check valve includes a fitted portion fitted into the opening.

3. The electromagnetic valve manifold according to claim 2, wherein:
   the base-side pilot fluid discharge passage is one of two base-side pilot fluid discharge passages, and
   the check valve is one of two check valves that respectively correspond to the two base-side pilot fluid discharge passages.

4. The electromagnetic valve manifold according to claim 1, wherein:
   an elastic portion is arranged between the inner circumferential surface of the insertion hole and the circumferential wall of the check valve, and
   the elastic portion is configured to be elastically deformed to generate a restoring force that fastens the circumferential wall of the check valve to the inner circumferential surface of the insertion hole.

5. The electromagnetic valve manifold according to claim 1, wherein:
   the gasket includes a metal plate and a rubber seal member joined to the metal plate,
   the metal plate includes a coupling portion including the insertion hole, and
   the check valve is inserted through the insertion hole to be fitted into the coupling portion.

6. The electromagnetic valve manifold according to claim 5, wherein:
   an elastic portion is arranged between the inner circumferential surface of the insertion hole and the circumferential wall of the check valve, and
   the elastic portion is configured to be elastically deformed to generate a restoring force that fastens the circumferential wall of the check valve to the inner circumferential surface of the insertion hole.

7. The electromagnetic valve manifold according to claim 1, wherein:
   the check valve includes a flange extending radially outward from an axial end of the circumferential wall, and
   the flange is held between the valve body and the gasket around the insertion hole.

8. The electromagnetic valve manifold according to claim 7, wherein:
   the valve body includes an opposing surface facing the gasket, and
   the opposing surface includes a recess into which the flange is fitted.

* * * * *